United States Patent [19]  
Ferrell

[11] 3,969,621  
[45] July 13, 1976

[54] MOTOR VEHICLE LIGHT ASSEMBLY UTILIZING TOTAL INTERNAL REFLECTION

[75] Inventor: Richard M. Ferrell, Westland, Mich.
[73] Assignee: Ford Motor Company, Dearborn, Mich.
[22] Filed: Nov. 18, 1974
[21] Appl. No.: 525,034

[52] U.S. Cl. ............... 240/41.35 C; 240/8.2; 240/8.3; 240/41.1; 240/41.2
[51] Int. Cl.² ............................................. F21V 7/00
[58] Field of Search .................. 240/8.2, 8.22, 8.3, 240/41.1, 41.2, 41.35 C, 7.1 F; 340/87, 89, 91, 93

[56] References Cited
UNITED STATES PATENTS

| | | | |
|---|---|---|---|
| 2,767,304 | 10/1956 | Orsatti | 240/8.2 |
| 3,456,153 | 7/1969 | Smith | 240/8.2 X |
| 3,603,928 | 9/1971 | Speedy et al. | 240/8.2 X |
| 3,831,018 | 8/1974 | Weber | 240/8.2 |

Primary Examiner—R. L. Moses  
Attorney, Agent, or Firm—Robert W. Brown; Keith L. Zerschling

[57] ABSTRACT

A light assembly for a motor vehicle includes a light source and a parabolic reflector for reflecting light emanating from the light source in the longitudinal direction of the vehicle. A lens is included in the light assembly. The lens is made from a transparent material and is positioned to produce total internal reflection of a portion of the light emanating from the light source and parabolic reflector. The totally internally reflected light rays are projected in a direction transverse to the motor vehicle. This enables a single light assembly to satisfy safety requirements pertaining to light projection both in the longitudinal direction of a vehicle and in its transverse direction.

6 Claims, 3 Drawing Figures

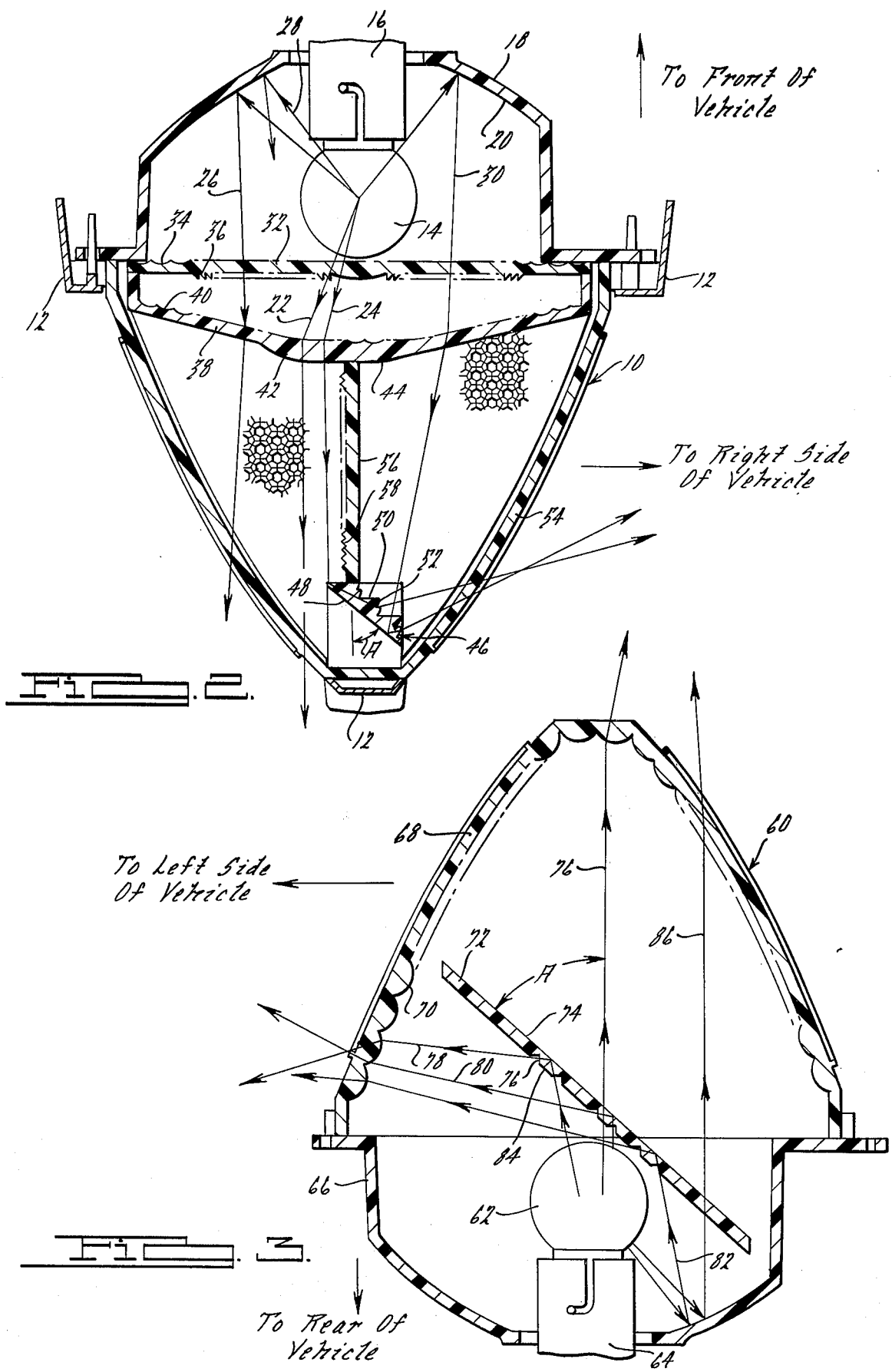

MOTOR VEHICLE LIGHT ASSEMBLY UTILIZING TOTAL INTERNAL REFLECTION

BACKGROUND

This invention relates to a light assembly for a motor vehicle. More particularly, it relates to a light assembly for projecting light in the longitudinal directions (either forwardly or rearwardly) of a vehicle and which also utilizes a lens to produce total internal reflection of light, thereby, to project such totally internally reflected light in a direction transverse to the motor vehicle.

Existing safety regulations require that motor vehicles include lighting systems to project light forward and to the rear of the motor vehicle with a specified viewing angle and light intensity. Also, such regulations require that the vehicle be equipped with side marker lights to project light in a direction transverse to the motor vehicle to provide a warning to persons located or approaching the vehicle from its side. The safety regulations also specify viewing angles and light intensities for such side marker lights.

The present invention provides a light assembly for a motor vehicle which is capable of satisfying the requirements for light projection in the longitudinal direction of the vehicle while simultaneously satisfying requirements pertaining to light projection in a direction transverse to the vehicle. This is accomplished through the use of a transparent lens capable of total internal reflection. The invention may be better understood by reference to the detailed description which follows and to the drawings.

BRIEF DESCRIPTION OF THE DRAWINGS

FIG. 2 is a sectional view of the tail light assembly of FIG. 1, the section being taken along the line 2—2 in FIG. 1; and FIG. 3 is a sectional view of an alternative embodiment of the invention particularly suitable for use as a parking or turn signal and side marker light assembly for the front of a motor vehicle.

DETAILED DESCRIPTION

Figure 1:
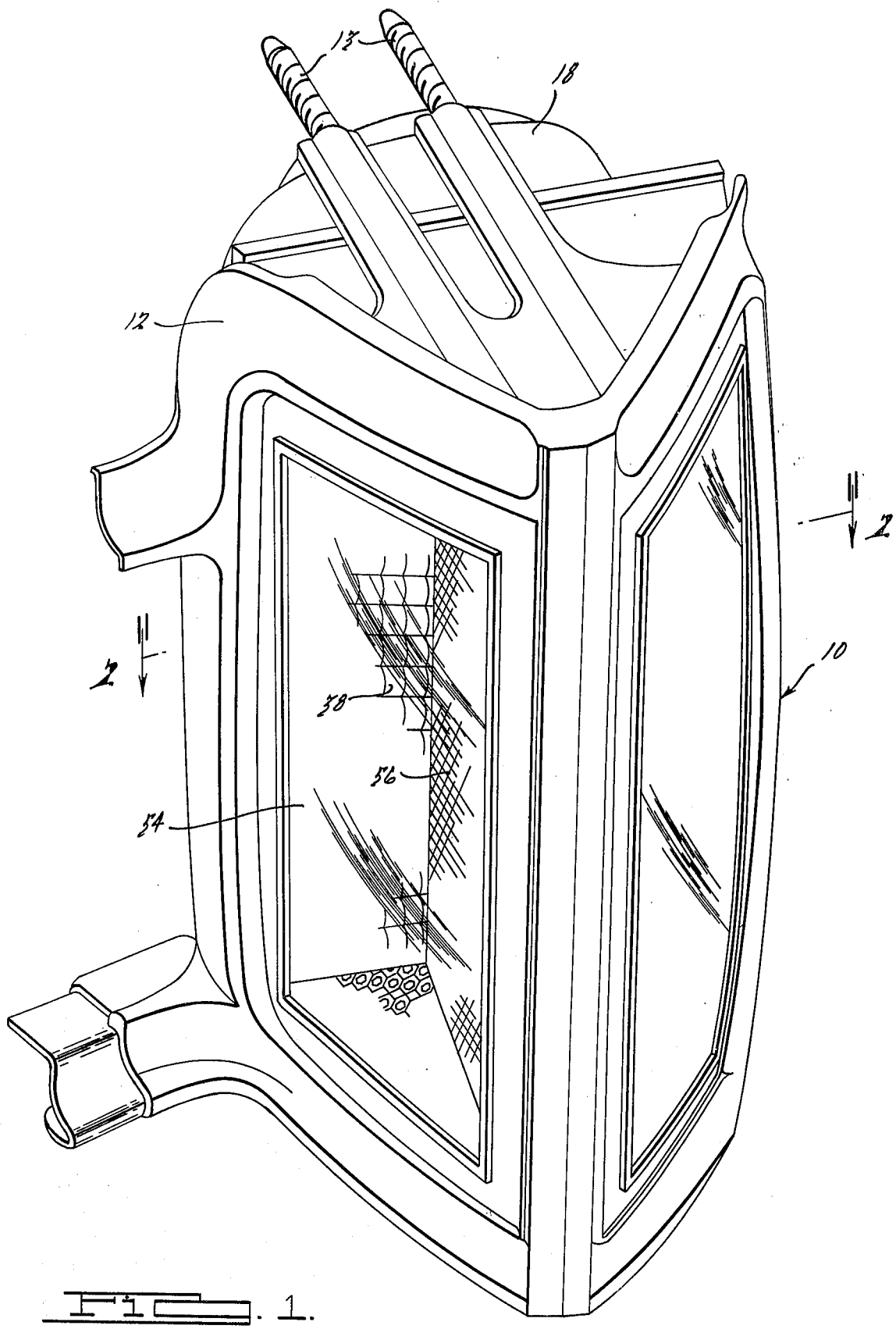
FIG. 1 is a perspective view of a tail light assembly for a motor vehicle.

With particular reference now to FIGS. 1 and 2, wherein like numerals refer to like parts in the two views, there is shown a tail light assembly generally designated by the numeral 10. The light assembly has a preferably die cast metal frame 12 and associated threaded studs 13 at its upper and lower portions to permit the light assembly to be secured to the rear of the vehicle.

The light assembly 10 includes an electric bulb light source 14 mounted in a socket 15 suitable for supplying the light source 14 with electrical power. Preferably, the filament of the light source 14 is positioned at the focal point of a parabolic reflector 18. The parabolic reflector 18 is opaque and preferably has a silver reflective coating or the like on its inner surface 20. A plurality of light sources and associated parabolic reflectors, vertically spaced from one another, may be provided. Some of the light from the light source 14 is projected directly in the rearward longitudinal direction of the vehicle, while another portion of the light is directed towards the parabolic reflector 18 and then projected therefrom in the rearward longitudinal direction of the vehicle. Light rays of the former type are indicated at 22 and 24, whereas light rays reflected from the parabolic reflector 18 are indicated by the numerals 26, 28 and 30.

The light rays projected rearwardly pass through a transparent and preferably clear plastic lens 32 having flute-shaped optics 34 on one of its surfaces and circular dioptric optics 36 on its opposite surface. The flute optics provide light dispersion whereas the dioptric optics collimate light rays emanating directly from the light source 14, thereby, to obscure the light source 14.

The light rays transmitted through the lens 32 pass through a transparent and preferably clear plastic lens 38. The lens 38 has pillow optics 40 on one of its surfaces and, in the central region on its opposite surface, has convex flutes 42 and 44. The pillow optics 40 tend to disperse the light emanating from the lens 32 and the convex fluted optics 42 and 44 collimate light rays which enter the lens 38 in its central region and generally direct such light rays in the longitudinal rearward direction of the vehicle and toward a transparent and preferably clear plastic lens 46.

The lens 46 is designed to produce total internal reflection of light rays which enter it from the generally longitudinal direction of the vehicle. The internally reflected light rays are projected in a direction transverse to the motor vehicle, that is, in a direction toward the right side of the vehicle as shown in FIG. 2. Of course, a symmetrically opposite light assembly 10 may be used to project light in a similar fashion toward the left side of the vehicle.

The lens 46 has a plane surface 48 which forms an angle A with the longitudinal direction of the vehicle. Preferably, this acute angle A is between 40° and 60°, the exact value of angle A depends upon the index of refraction of the material from which lens 46 is fabricated. The opposite surface of the lens 46 includes optics 50 which are surfaces that are perpendicular to the longitudinal direction of the vehicle. Light rays which enter the lens 46 through the perpendicular surfaces 50 are not transmitted through the lens 46 but rather are reflected from its plane surface 48. This total internal reflection produced by the lens 46 is exemplified by the paths taken by light rays 24 and 30. The lens 46 is provided with convex optics 52 which disperse the light rays totally internally reflected by the lens 46. The lens 46 is elongated and extends for the full vertical length of the light assembly 10.

The light rays projected from the light assembly 10 in both the longitudinal and transverse directions of the vehicle pass through a transparent and preferably red-tinted housing 54 which encloses the lenses 32, 38 and 46 as well as a lens 56 located between the lenses 38 and 46. The lens 56 is a retroreflector. It has cube-corner optics 58 on one of its surfaces to provide reflection of light rays which enter the light assembly 10 from the right side of the vehicle.

With particular reference now to FIG. 3, there is shown an alternative embodiment of the invention particularly suitable for use as a parking lamp or turn signal light mounted on the front of a motor vehicle. The light assembly of FIG. 3, generally designated by the numeral 60, includes a light source 62 positioned in an electrical socket 64 and located preferably with its filament at the focal point of an opaque parabolic reflector 66. A transparent plastic housing 68 encloses the light source 62. The housing 68 has light dispersing optics 70 on its inner surface.

A transparent and preferably clear plastic lens 72 extends in front of the light source 62. The lens 72 has a plane surface 74, which forms an acute angle a, preferably between 40° and 60°, with the longitudinal forward direction of the vehicle. This direction is generally designated by a light ray 76 emanating from the light source 62 and passing directly through the lens 72. The lens 72 has optics 76 formed on its opposite surface. Light rays which enter the lens 72 through these optics 76 are totally internally reflected by the lens 72 and are projected in the transverse direction of the vehicle, that is, to the left side of the vehicle as viewed in FIG. 3. Light rays 78 and 80 are indicative of totally internally reflected light emanating directly from the light source 62. Light ray 82 is indicative of light reflected by the parabolic reflector 66 and then totally internally reflected by the lens 72.

The lens 72 has flat surfaces 84, which are parallel to the surface 74 and interspersed among the optics 76. Light rays which enter the lens 72 through these flat surfaces 84 are not reflected, but rather are transmitted through the lens as indicated by the light rays 76 and 86. Thus, the light assembly 60 projects light in the longitudinal forward direction of the vehicle and in a direction transverse to the vehicle. The transverse light projection forms a side marker function required in vehicle lighting systems. Of course, the light assembly 10 for the rear of the vehicle also performs the required side marker function. Preferably, the plastic lenses in the light assemblies described herein are made of acrylic or polycarbonates plastics, but other materials may be substituted. Also, the totally internally reflecting lenses employed in the light assemblies of the invention may be modified to include other optic designs capable of producing total internal reflection of light which is incident upon the lens from the longitudinal direction of the vehicle and which is projected in a direction transverse to the vehicle.

Based upon the foregoing description of the invention, what is claimed is:

1. A light assembly for a motor vehicle, said light assembly being designed to project light both in the longitudinal direction of said motor vehicle and in a direction transverse to said motor vehicle, said light assembly comprising:
   a light source;
   a parabolic reflector, said light source being positioned at the focal point of said parabolic reflector and said parabolic reflector defining a general direction of light projection;
   a lens made from a transparent material, said lens having a plane surface and a surface having a plurality of optics, said lens surface having a plurality of optics including certain portions interspersed among said optics, said surface portions being flat and parallel to said plane surface of said lens, thereby, to permit light rays entering said lens at said surface portions to be transmitted through said lens, said optics being of a type capable of producing total internal reflection of light rays entering said lens from the direction of said parabolic reflector and said light source, and said optics projecting said totally internally reflected light rays in a direction substantially transverse to said general direction.

2. A light assembly according to claim 1 wherein said plane surface of said lens forms an acute angle of from about 40° to 60° with respect to said general direction of light projection.

3. A light assembly for a motor vehicle, said light assembly being designed to project light both in the longitudinal direction of said motor vehicle and in a direction transverse to said motor vehicle, said light assembly comprising:
   a light source;
   a parabolic reflector adapted to be secured to said motor vehicle, said light source being positioned at the focal point of said parabolic reflector and said parabolic reflector being positioned to reflect light emanating from said light source in the longitudinal direction of said motor vehicle;
   a transparent housing enclosing said parabolic reflector and said light source;
   a lens made from a transparent material, said lens having a plane surface and a surface containing optics for producing total internal reflection in said lens of light incident thereon from said light source and said parabolic reflector, light totally internally reflected by said lens being projected through said transparent housing in a direction substantially transverse to said motor vehicle; and
   a second lens interposed between said light source and said first-mentioned lens, said second lens being positioned to transmit light rays emanating from said light source and said parabolic reflector, and said second lens including optic means for collimating light rays and for directing such collimating light rays toward said first-mentioned lens.

4. A light assembly according to claim 3, wherein said plane surface of said first-mentioned lens is positioned at an angle of from about 40° to about 60° with respect to the longitudinal direction of said motor vehicle.

5. A light assembly according to claim 4 wherein said transparent housing lens includes optic means for dispersing said light totally internally reflected by said first-mentioned lens, said dispersed light being projected through said housing in a direction substantially transverse to said motor vehicle.

6. A light assembly for a motor vehicle, said light assembly being designed to project light both in the longitudinal direction of said motor vehicle and in a direction transverse to said motor vehicle, said light assembly comprising:
   a light source;
   a parabolic reflector, said light source being positioned at the focal point of said parabolic reflector and said parabolic reflector defining a general direction of light projection;
   a lens made from a transparent material, said lens having a plane surface, forming an acute angle of from about 40° to about 60° with respect to said general direction of light projection, and a surface having a plurality of optics, said optics being of a type capable of producing total internal reflection of light rays entering said lens from the direction of said parabolic reflector and said light source, and said optics projecting said totally internally reflected light rays in a direction substantially transverse to said general direction, said lens including optic means for dispersing said totally internally reflected light rays projected in a direction substantially transverse to said general direction.

* * * * *